United States Patent [19]
Hoshiyama

[11] Patent Number: 5,933,239
[45] Date of Patent: Aug. 3, 1999

[54] SCALE FOR MEASURING DIMENSION OF ARTICLE AND SCALE TO BE USED IN THE SAME

[75] Inventor: Hiroki Hoshiyama, Hamamatsu, Japan

[73] Assignee: Japan E.M. Co., Ltd., Japan

[21] Appl. No.: 08/893,524

[22] Filed: Jul. 11, 1997

Related U.S. Application Data

[60] Continuation of application No. 08/642,674, May 3, 1996, abandoned, which is a division of application No. 08/453,525, May 30, 1995, abandoned.

[30] Foreign Application Priority Data

May 31, 1994 [JP] Japan ................................. 6-141131
Jun. 21, 1994 [JP] Japan ................................. 6-139085
Jun. 28, 1994 [JP] Japan ................................. 6-146531

[51] Int. Cl.$^6$ ................................................ G01B 11/00
[52] U.S. Cl. ..................................... 356/372; 356/397
[58] Field of Search ................................. 356/372, 373, 356/375, 394, 397, 384–387; 382/142; 348/87, 126

[56] References Cited

U.S. PATENT DOCUMENTS

| 2,650,518 | 9/1953 | Jaroff et al. ........................... 356/397 |
| 4,172,662 | 10/1979 | Vogel .................................... 356/397 |
| 4,269,515 | 5/1981 | Altman . | |
| 4,393,401 | 7/1983 | Gorenflo et al. ...................... 356/397 |

FOREIGN PATENT DOCUMENTS

| 3323836 | 1/1985 | Germany . |
| 90/09559 | 8/1990 | WIPO . |

Primary Examiner—Hoa Q. Pham
Attorney, Agent, or Firm—Rogers & Killeen

[57] ABSTRACT

A scale has marks of a point-symmetrical shape which are arranged in matrix. The scale and an article to be measured in dimension are positioned without any relative movement. An image sensor unit detects a predetermined portion of the article and the marks of the scale corresponding to the predetermined portion of the article selectively and successively, and the image sensor unit generates output signals in accordance with the detected results of the article and the scale. The output signals are processed to calculate the dimension of the article.

12 Claims, 5 Drawing Sheets

SCALE FOR MEASURING DIMENSION OF ARTICLE AND SCALE TO BE USED IN THE SAME

This is a continuation of application Ser. No. 08/642,674, filed on May 3, 1996 now abandoned which is a division of application Ser. No. 08/453,525 filed May 30, 1995, now abandoned.

FIELD OF THE INVENTION

The invention relates to an apparatus for measuring dimension, angle, distance, size etc. (defined "dimension" simply hereinafter) of an article and a scale to be used in the same, and more particularly to, an apparatus for improving precision in measuring dimension of an article regardless of a portion of the article to be measured and a scale to be used in the same.

BACKGROUND OF THE INVENTION

A conventional apparatus for measuring dimension of an article is described in the Japanese Patent Publication No. 5-85004 published on Dec. 6, 1993. The conventional apparatus for measuring dimension of an article comprises X- and X-transparent scale plates having marks for scales, a mount place for placing a rectangular sheet article to be measured thereon, a light equipment for radiating light to the article placed on the transparent scale plates, and X-, Y- and origin image sensors for receiving light transmitted through the X- and Y-transparent scale plates.

In operation, the rectangular sheet article is placed on the mount plate, such that first and second orthogonal sides of the rectangular sheet article are positioned on inner portions of the X- and Y-transparent scale plates, and a vertex defined by the first and second orthogonal sides is positioned on an inner portion of a crossing area of the X- and Y-transparent scale plates. Then, light is radiated from the light equipment to the X- and Y-transparent scale plates, so that light transmitted through outer portions of the X- and Y-transparent scale plates and an outer portion of the crossing area is received by X-, Y- and origin image sensors. In accordance with output signals of the X-, Y- and origin image sensors, a position of the vertex defined by the first and second orthogonal sides of the rectangular sheet article, and positions of two other vertexes defined by the second side and a third side of the rectangular sheet article, and by the first side and a fourth side of the rectangular sheet article are determined relative to the scales of the X- and Y-transparent scale plates. Consequently, lengths of the first to fourth sides of the rectangular sheet article, lengths of diagonal lines of the rectangular sheet article and vertex angles of the rectangular sheet article are obtained in accordance with the calculation of using the positions of the three vertexes of the rectangular sheet article.

In the conventional apparatus for measuring dimension of an article, however, there are disadvantages in that, for instance, a distance between two arbitrary points on the rectangular sheet article is impossible to be measured, because the positions of the vertexes are detected by using the X- and Y-transparent scale plates, and any pattern defined on the rectangular sheet article can not be measured, even if the pattern is positioned in the vicinity of the first and second sides, because each of the X- and Y-image sensors can not discriminate the pattern from the marks for the scales due to the structure in which the rectangular sheet article is positioned directly on the X- and Y-scale plates.

SUMMARY OF THE INVENTION

Accordingly, it is an object of the invention to provide an apparatus for measuring dimension of an article in which a distance between two arbitrary points on an article can be measured, even if the two points are far from, or off sides or edges of the article, and a scale to be used in the same.

It is a further object of the invention to provide an apparatus for measuring dimension of an article in which marks for a scale and a pattern defined on the article are precisely discriminated from the others to increase precision in measuring the dimension of the article, and a scale to be used in the same.

According to the feature of the invention, an apparatus for measuring dimension of an article, comprises:

a table for placing an article to be measured in dimension thereon;

a scale having marks arranged in matrix;

means for commonly moving the table and the scale;

an image sensor unit for selectively detecting a portion of the article and the marks of the scale corresponding to the portion of the article;

means for providing a relative movement between the table and the image sensor unit; and a calculation unit for calculating the dimension of the article in accordance with output signals of the image sensor unit.

According to another feature of the invention, a scale to be used in an apparatus for measuring dimension of an article, comprises:

a scale substrate;

marks arranged in matrix on the scale substrat, each of the marks having a width of W and a height of W, and being arranged by a pitch of $P_1$, and each of the marks being of a point-symmetrical shape, wherein the marks meet conditions as defined below, $2P_1-W<V,$ $W<P_1/2,$ and $2P_2 \leq W$ where V is a view area of an image sensor unit to detect the scale, and $P_2$ is a pitch of matrix-arranged sensors of the image sensor unit.

BRIEF DESCRIPTION OF THE DRAWINGS

The invention will be explained in more detail in conjunction with appended drawings, wherein:

FIGS. 1A to 1H are explanatory diagrams showing an apparatus for measuring dimension of an article in a first preferred embodiment according to the invention, in which FIG. 1A shows the apparatus, FIG. 1B shows a scale used in the apparatus, FIG. 1C shows marks for the scale, FIG. 1D shows an image sensor unit used in the apparatus, FIG. 1E shows an article to be measured in the apparatus, and FIGS. 1F to 1H show the relation of CCD sensors of the image sensor unit to a mark of the scale in the apparatus.

DESCRIPTION OF THE PREFERRED EMBODIMENTS

An apparatus for measuring dimension of an article in the first preferred embodiment according to the invention will be explained in FIGS. 1A to 1H.

Figure 1A:
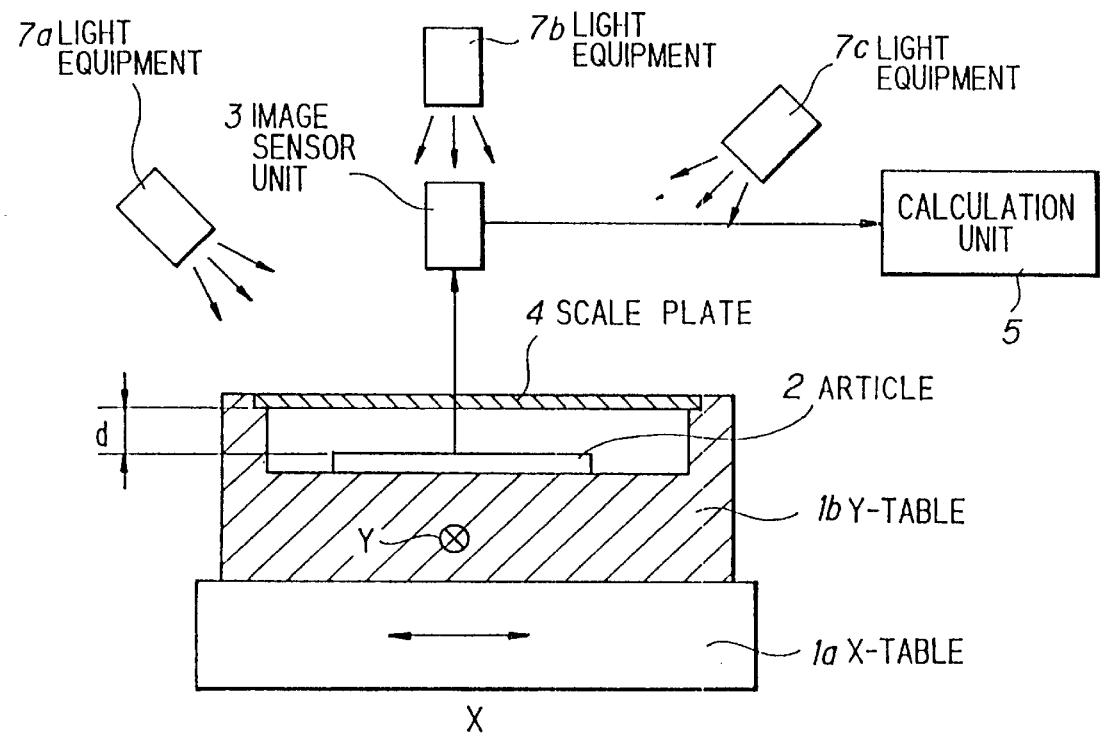

In FIG. 1A, the apparatus comprises an X-table 1a moving in the X-direction indicated by an arrow, a Y-table 1b moving in the Y-direction orthogonal to the X-direction, on which an article 2 is placed on be measured in dimension, a transparent scale plate 4 provided on the Y-table 1b to have a scale on one surface thereof, an image sensor unit 3 having a focusing system (not shown) to be focused on the article 2 and the scale of the scale plate 4 selectively, a calculation unit 5 for calculating dimension of the article 2 by receiving output signals of the image sensor unit 3, and light equipments 7a, 7b and 7c for directing light through the scale plate to the article 2.

In the apparatus, the Y-table 1b and the scale plate 4 are designed, such that the article 2 is placed on the Y-table 1b to have a distance d greater than a focus depth of the focusing system of the image sensor unit 3 from the scale plate 4.

Figure 1B:
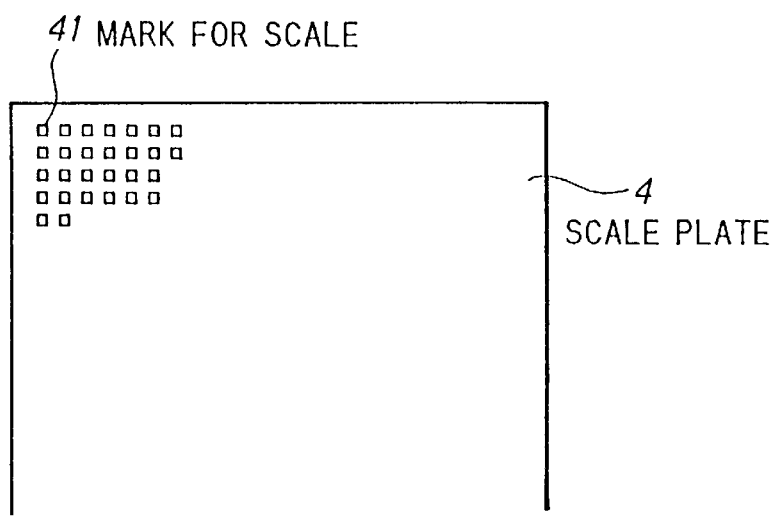

FIG. 1B shows the transparent scale plate 4 having marks 41 for the scale arranged in matrix.

Figure 1C:
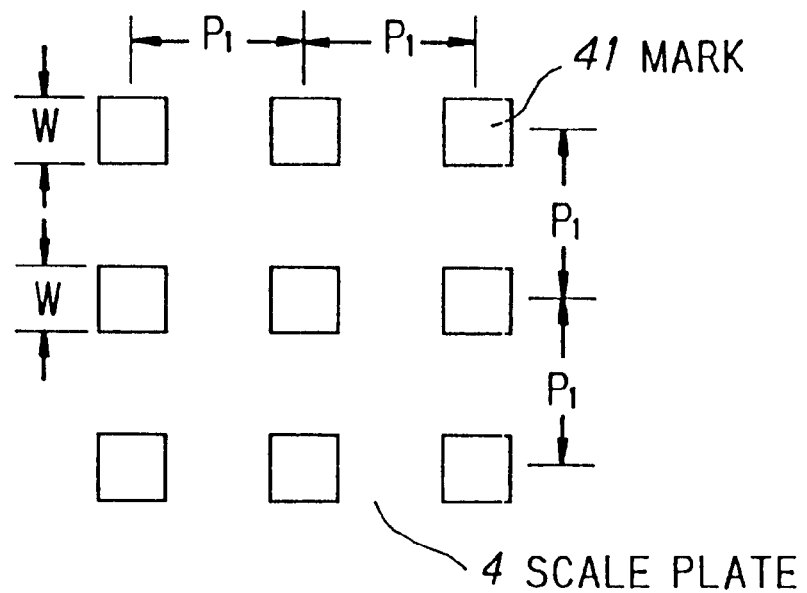

In FIG. 1C, the marks 41 which are enlarged are of a width W and a height H, and arrayed by a pitch $P_1$.

Figure 1D:
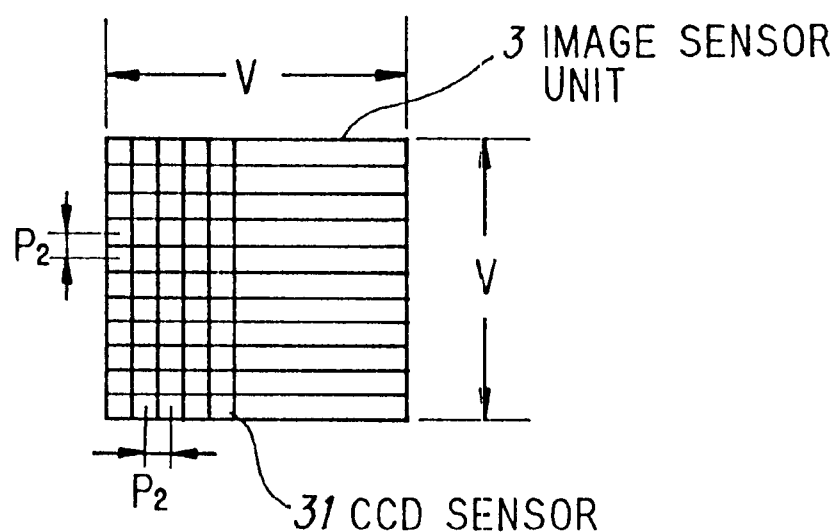

FIG. 1D shows a view area V×V on the marka 41 of the scale plate 4 or the article 2 covered by CCD sensors 31 of the image sensor unit 3, wherein the CCD sensors 31 are arranged in matrix by a pitch $P_2$.

Figure 1E:
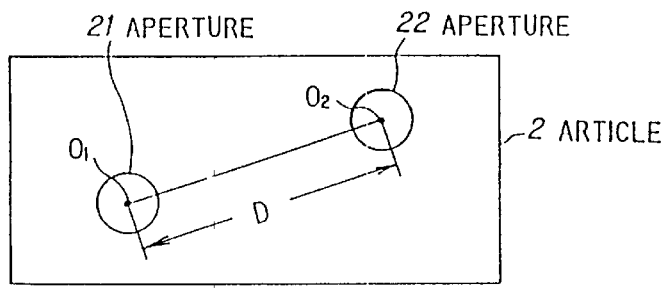

FIG. 1E shows the article 2 of, for instance, a metal plate having apertures 21 and 22 formed by a distance O between the central points $O_1$ and $O_2$ thereof.

Figure 1F:
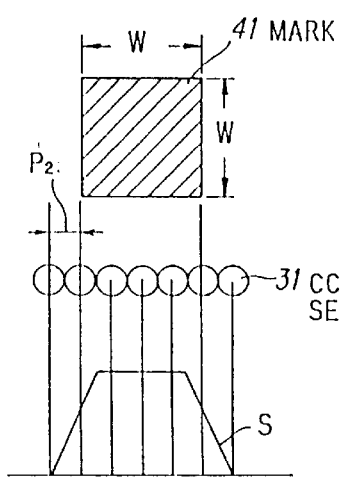
Figure 1G:
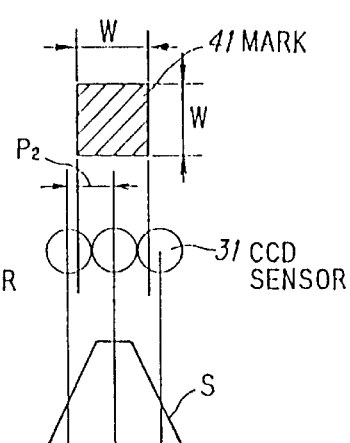
Figure 1H:
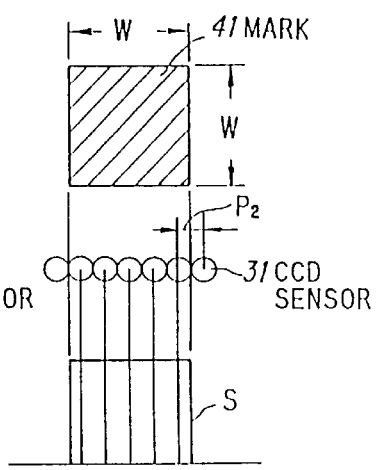

In FIGS. 1F to 1H, the CCD sensors 31 of the image sensor unit 3 detect the mark 41 of the scale plate 4, so that a detected signal S is supplied to the calculation unit 5, wherein a waveform of the output signal S depends on the relation between the width W of the mark 41 and the pitch $P_1$ of the CCD sensors 31 of the image sensor unit 3, and the relative position of the CCD sensors 31 to the mark 41.

In order to locate a specific one of the marka 41 having the same size and configuration, the conditions must be met as set out below.

$$M<P_1/2 \quad (1)$$

where M is an approximate position precision of the X-and-Y-tables 1a and 1b, even if a scale other than one used in the invention is used.

$$2P_1+W<V_1 \quad (2)$$

This means that more than two marks 41 must be covered in the X- and Y-directions by the image sensor unit 3.

$$W<P_1/2 \quad (3)$$

This means that a ratio of the pitch $P_1$ to the width W must be less than two, so that the influence of the article 2 to an image of the marks 41, that is the deterioration of resolution of suppressed to below.

$$2P_2 \leq W \quad (4)$$

This means that the width W must be larger relative to the pitch $P_1$ of the CCD sensors 31 by a predetermined value, that is, two times. Consequently, the central point of each mark 41 is precisely obtained in accordance with the processing of the output signals S. The relation as shown in FIG. 1G does not meet the above condition to generate the output signal S which is of a pulse-like waveform, while the relations as shown in FIGS. 1F and 1H meet the above condition to provide the output signals S which are of a step-shaped waveform.

The step-shaped waveform is advantageous in processing the output signals S, and discriminating dust on the scale-plate 4 from the marks 41.

In measuring dimension of the article 2, the calculation unit 5 uses the central points of the marks 41. Therefore, the width W of the marks 41 is permissible to have deviation, because the central points thereof are not deviated due to the structure in which the marks 41 are square to be symmetrical in regard to the central points.

In this sense, the marks 41 are not limited to be square, but point-symmetrical shapes such as circle, etc.

As discussed above, one specific optimum example is as follows.

W=80 $\mu$m, $P_1$=100 $\mu$m, V=1000 $\mu$m, M=100 $\mu$m, and $P_2$=2 $\mu$m.

As described in FIG. 1A, the article 2 is separated on optical axis from the marks 41 of the scale plate 4 by the predetermined distance preferably largely greater than the focus depth.

In one specific example, d=5 to 10 mm, when the focus depth of the focusing system of the image sensor unit 3 is 14 $\mu$m.

In operation, the X- and Y-tables 1a and 1b are controlled successively to move in the X- and Y-directions, respectively, so that the aperture 21 of the article 2 is positioned below the image sensor unit 3. As this state, the aperture 21 and the marks 41 of the scale plate 4 covering the aperture 21 are focused separately by the focusing system of the image sensor unit 3. Thus, the aperture 21 and the marks 41 are detected separately by the CCD sensors 31 of the image sensor unit 3, so that output signals 9 are supplied therefrom to the calculation unit 5, in which the central point $O_1$ of the aperture 21 is calculated in accordance with addresses of the marks 41. Then, the X- and Y-tables 1a and 1b are moved in the X- and Y-directions, respectively, so that the aperture 22 of the article 2 is positioned below the image sensor unit 3. In the same manner as in the aperture 21, the central point $O_1$ of the aperture 22 is calculated in accordance with addresses of the marks 41 in the calculation unit 5.

Then, the distance D between the central points $O_1$ and $O_2$ of the apertures 21 and 22 is calculated in accordance with the calculated positions thereof in the calculation unit 5.

In an apparatus for measuring dimension of an article in the invention, an image sensor unit 3 may be moved in the X- and Y-directions, while an article 2 and a scale may be stationary, and a magnetical detecting system may be adopted in place of the optical detecting system as adopted above.

Figure 2:
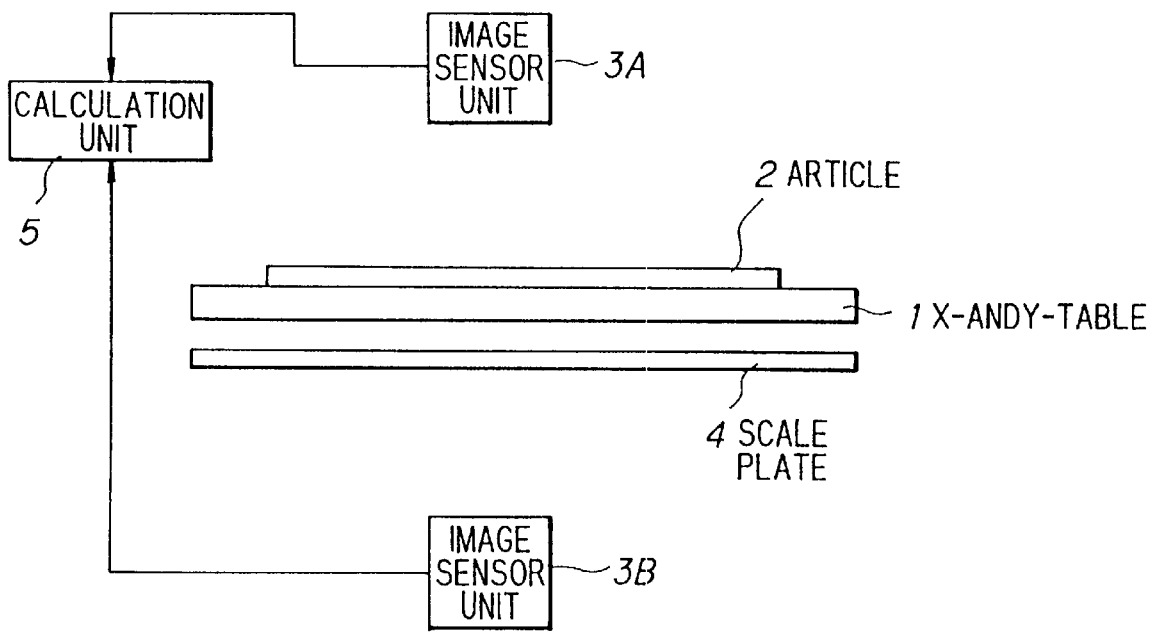
FIGS. 2 to 4 are explanatory diagrams showing apparatuses for measuring dimension of an article in second to fourth preferred embodiments according to the invention.

FIG. 2 shows an apparatus for measuring dimension of an article in the second preferred embodiment according to the invention, wherein like parts are indicated by like reference numerals as used in the first preferred embodiment, provided that the scale plate 4 having the marks for the scale is provided on the opposite side to the article 2.

In the apparatus, the X- and Y-tables are simply shown by a table 1, and the image sensor unit 3 as shown in FIG. 1A is replaced by image sensor units 3A and 3B which are provided at the same positions on the opposite sides relative to the table 1.

In operation, the article 2 and the scale plate 4 are moved to take the same positions relative to the image sensor units 3A and 3B in accordance with the X- and Y-movements of the table 1. Thus, output signals of the image sensor units 3A and 3B are supplied to the calculation unit 5, in which the output signals are processed to calculate dimension of the article 2.

Figure 3:
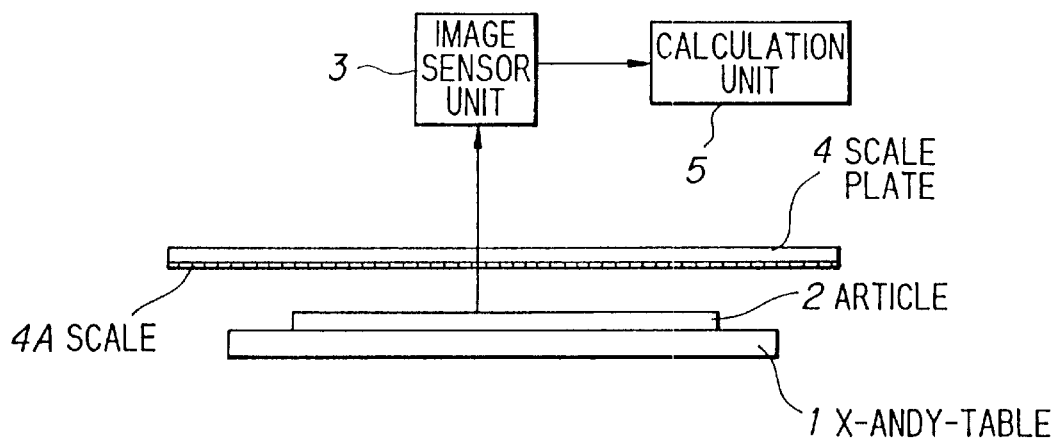

FIG. 3 shows an apparatus for measuring dimension of an article in the third preferred embodiment according to the invention, wherein like parts are indicated by like reference numerals as used in the first and second preferred embodiments.

In the apparatus, the scale plate 4 has the scale 4A on the surface facing the article 2 to increase precision in measuring dimension of the article 2 for the reason why both the article 2 and the scale 4A are detected through the scale plate 4 by the image sensor unit 3, so that the influence of a refractive index of the scale plate 4 is commonly applied to the detecting lights of the article 2 and the scale 4A.

Figure 4:
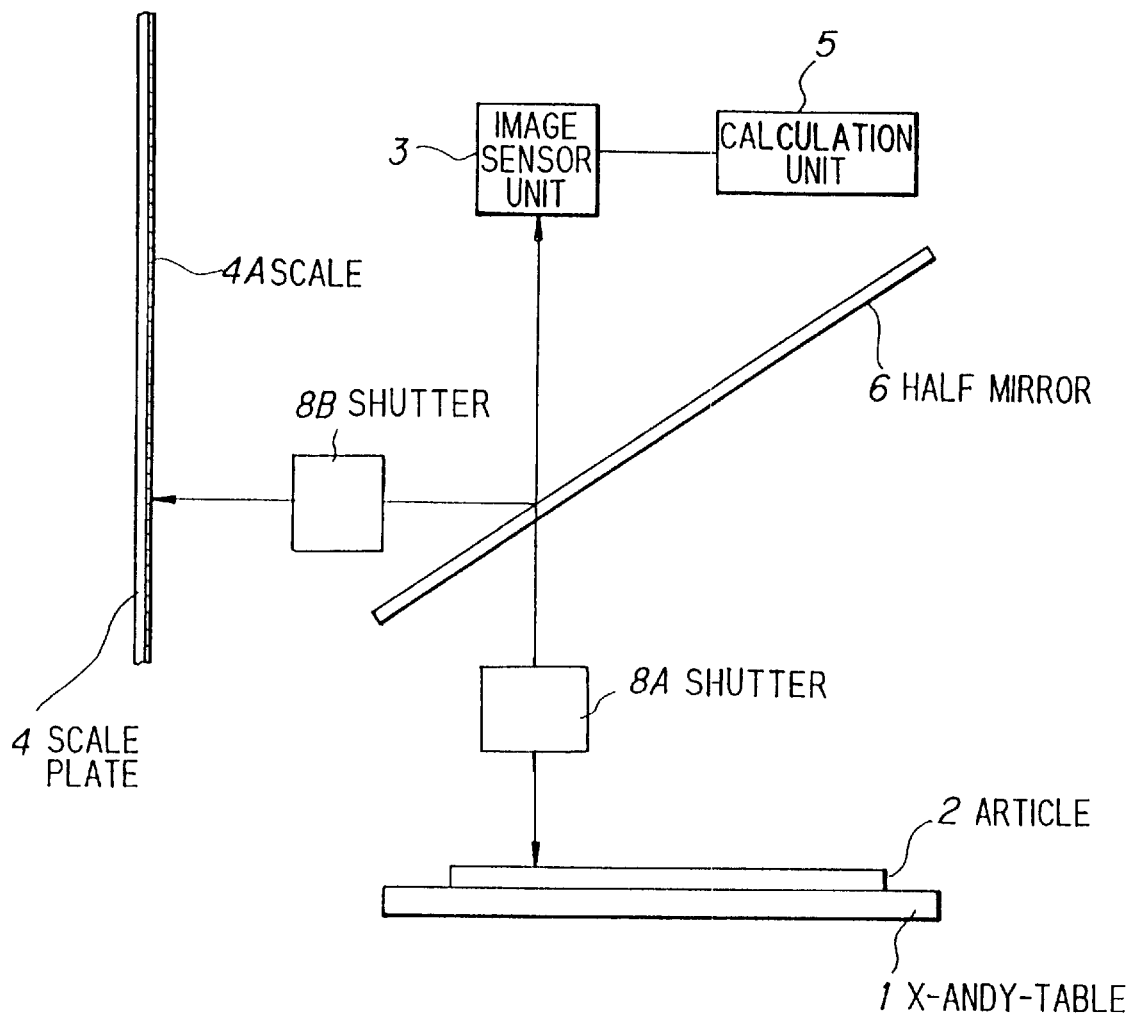

FIG. 4 shows an apparatus for measuring dimension of an article in the fourth preferred embodiment according to the invention, wherein like parts are indicated by like reference numerals as used in the first to third preferred embodiments.

In the apparatus, a half mirror 5 is provided at an angle of 45° relative to the X- and Y-table 1 and the scale table 4 having the scale 4A, and shutters 8A and 8B are provided to shut one of light paths for the scale 4A and the article 2. The shutters 8A and 8B may be omitted when other means such as using different wavelengths of lights for the scale 4A and the article 2 is adopted.

In operation, a predetermined portion of the article 2 and the relevant marks of the scale 4A are selectively detected in accordance with the switch-over of the shutters 8A and 8B by the image sensor unit 3.

In the second and fourth preferred embodiments, optical distances can be equal to increase error.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A scale to be used in an apparatus for measuring dimension of an article, comprising:

a scale substrate;

marks arranged in a matrix on said scale (substra) substrate, each of said marks having a width of W and a height of W, and being arranged by a pitch of $P_1$, and each of said marks being of a point-symmetrical shape, wherein said marks meets conditions as defined below, $2P_1 + W < V,$ $W < P_1/2,$ and $2P_2 \leq W$ where V is a length of a side of a view area of an image sensor unit for detecting said scale, and $P_2$ is a pitch of matrix-arranged sensors of the image sensor unit.

2. The scale of claim 1 wherein said marks are square.

3. The scale of claim 1 wherein said marks are round.

4. The scale of claim 1 wherein said substrate is transparent.

5. A combination scale and image sensor unit for an apparatus for measuring a dimension of an article, said scale comprising a substrate with a first matrix of symmetrically shaped marks thereon which are arranged in the first matrix with pitch P1, each of the marks having a corresponding internal distance which is approximately W;

said image sensor unit for detecting said marks on said scale in a view area with a side of length V and comprising plural sensors arranged in a second matrix with a pitch P2, and wherein, $2P_1 + W < V,$ $W < P_1/2,$ and $2P_2 \leq W.$ 6. The combination of claim 5 wherein each of said plural sensors comprises a CCD sensor.

7. The combination of claim 5 wherein said marks are square and W is the length of a side thereof.

8. The combination of claim 5 wherein said marks are round and W is the diameter thereof.

9. The combination of claim 5 wherein said substrate is transparent.

10. The combination of claim 5 wherein said view area is square.

11. The combination of claim 5 wherein said image sensor unit is further for providing an output signal with a step-shaped waveform related to each detected one of said marks so that a central point of each of the detected said marks can be identified.

12. The combination of claim 11 further comprising a calculation unit for receiving said output signal and for comparing a first received said output signal to a second received said output signal to measure a dimension related to said first and second output signals.

* * * * *